United States Patent [19]

Ebner

[11] Patent Number: 4,485,757
[45] Date of Patent: Dec. 4, 1984

[54] PROCESS AND APPARATUS FOR APPLYING RELATIVELY HARD PARTICLES TO A CIRCULAR WIRE-LIKE FORM OR A WIRE-LIKE FORM WITHOUT LONGITUDINAL EDGES, AS WELL AS WIRE-SHAPED SAW

[75] Inventor: Walter Ebner, Le Locle, Switzerland

[73] Assignee: Caspar O. H. Messner, Zurich, Switzerland

[21] Appl. No.: 444,485

[22] Filed: Nov. 24, 1982

[30] Foreign Application Priority Data

Nov. 28, 1981 [DE] Fed. Rep. of Germany ....... 3147287

[51] Int. Cl.³ .............................................. B05C 11/00
[52] U.S. Cl. ........................................ 118/44; 118/78; 118/211; 118/233; 118/234; 118/241; 427/180; 427/198
[58] Field of Search .......................... 72/252, 250, 206; 29/525, 432, 169.5; 427/180, 198; 118/44, 76, 78, 107, 113, 115, 119, 120, 211, 233, 234, 241; 76/112, 25 R

[56] References Cited

U.S. PATENT DOCUMENTS

| | | | |
|---|---|---|---|
| 2,476,298 | 7/1949 | Heizer | 118/234 |
| 2,601,394 | 6/1952 | Hansen | 118/249 X |
| 3,961,104 | 6/1976 | Tanner | 427/198 |

FOREIGN PATENT DOCUMENTS

28447  5/1981  European Pat. Off. .............. 72/189

Primary Examiner—Shrive P. Beck
Attorney, Agent, or Firm—Craig & Burns

[57] ABSTRACT

An apparatus and a process are disclosed making it possible to mount, without disadvantages, relatively hard particles, such as diamond dust and the like, on wire-like base material in such a way that the diamond dust is not damaged, wherein any desired coating, that is, especially also a coating coherent over the length of the wire, can be produced. This coating is at least macroscopically homogeneous in character. In such a process for the application of relatively hard particles to a circular wire-like form or a wire-like form without longitudinal edges, for the purpose of producing a plain or multiple saw, the form is coated under pressure with the aid of a surface of two rolls. This surface is at least partially provided with the particles to be applied. The wire-like form is turned about its longitudinal axis during this process. The form must be present in the straight, that is stretched, condition.

The process can be performed with an apparatus exhibiting two hardened and ground rolls movable relatively to each other. These rolls serve for the accommodation of hard particles and the form to be coated, and for rolling the form between the two outer surfaces of the rolls. The to and fro movement for rolling the form takes place mechanically.

18 Claims, 7 Drawing Figures

PROCESS AND APPARATUS FOR APPLYING RELATIVELY HARD PARTICLES TO A CIRCULAR WIRE-LIKE FORM OR A WIRE-LIKE FORM WITHOUT LONGITUDINAL EDGES, AS WELL AS WIRE-SHAPED SAW

TECHNICAL FIELD

The present invention relates to a process and an apparatus for applying relatively hard particles to a circular wire-like form of a wire-like form without longitudinal edges, to produce a plain or multiple saw or a wire-shaped saw.

BACKGROUND ART

Wires coated with hard particles, such as diamond dust, and utilized as a saw are conventional. Such saws, so-called wires saws, are forms which are open at both ends because it has not been possible heretofore to produce endless wires without a weld seam. Such saw wires would be breakable at the weld seams. By increasing the wire length coated with relatively hard particles, the number of switchovers per unit time can be reduced for a reciprocating sawing motion. This results in an increased lifetime for these saw wires.

This realization has been exploited for years. The saw wire is called a diamond saw wire. However, it has not completely proven itself in its previous design. It wears very quickly. During the sawing operations, the diamond particles are torn out and the base material has become so brittle by the coating process that the saw wire, due to rupture, not only fails but is entirely useless.

It has been found by detailed testing that even the application of diamond dust by rolling, with the aid of a pair of rolls of hardened steel, does not provide the desired success. Although, such a wire saw exhibits a longer life, the diamond dust, though, cannot be rolled on the wire, serving as the basic member, with a required uniformity, so that the cutting properties of the wire do not afford the expected improvements.

A process has been known from German Pat. No. 2,303,897 for the manufacture of a cutting tool for stone wherein a strip is first provided with oil or grease along the narrow sides and then passes through a station with diamond grains wherein the grains adhere to the zones coated with oil or grease. In the subsequent rolls, the grains are then pressed into the strip. Then, the strip is mechanically twisted, and the thus-twisted strip is hardened in a heating device. By the use of a soft strip, pressing-in of the diamond grains is simplified. But, thereafter hardening of the strip is necessary. This latter step is very difficult, because in case of too high a hardening temperature, the diamond bodies can sustain irreparable damage. Furthermore, the application of the diamond grains to zones provided with oil or grease can be disadvantageous, because the zones cannot be exactly defined, and can readily be blurred by external influences during the manufacturing process. Finally, it is necessary in the known process to produce the free spaces required for removing sawdust by the twisting of a strip, so that, in total, a precise saw cut free of chatter marks cannot be obtained.

In constrast, the invention is based on the object of providing a process permitting the attachment of even harder particles, such as diamond dust or the like, without disadvantage to wire-like, hardened base material, in such a way that a diamond dust is not harmed. This process establishes a reproducible coating of any kind, especially a coating coherent over the length of the wire. This coating is of a microscopically homogeneous character and can be fashioned so that vacant spaces for removal of sawdust are produced while simultaneously preserving the wire structure as a cylindrical body so that highly precise cuts can be performed with smooth cutting surfaces.

This object has been attained by the features set forth in the claims.

Along these lines the process of this invention is distinguished in that form is brought into contact, under pressure, with a surface of two rolls, at least partially provided with the particles to be applied, while the wire-like form is being rotated about its longitudinal axis.

This process makes it possible to manufacture plain or multiple wire saws according to this invention.

These and other objects, features and advantages of the present invention will become more apparent from the following description when taken in connection with the accompanying drawings which show, for purposes of illustration only, several embodiments in accordance with the present invention, and wherein.

DESCRIPTION OF THE INVENTION

Figure 1:
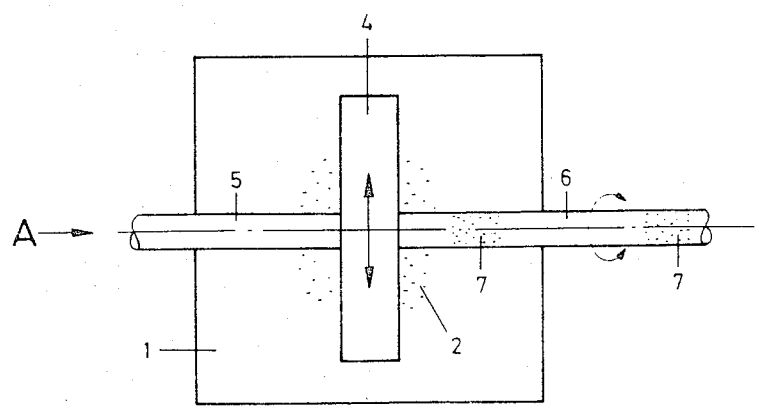
FIG. 1 is a manual tool shown in elevational view for the coating of a wire with relatively hard particles.
Figure 2:
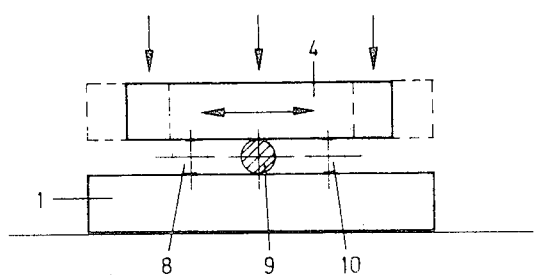
FIG. 2 shows the manual tool of FIG. 1 as seen from side "A"

Referring now to the drawings wherein like reference numerals are used through the various views to designate like parts. FIG. 1 and FIG. 2 show in purely schematic form a hardened steel plate 1 on which diamond dust 2 has been strewed. This diamond dust has been sprayed with an adhesive. A hardened steel pressure plate 4, manually movable to and fro under pressure, rests on the wire to be coated. The wire is unreeled from a reel (not shown) and is introduced underneath the pressure plate 4 as wire 5 to be coated. After the treatment, the wire leaves the device as coated wire 6.

For coating purposes, the wire 5 is provided with a coating 7 of diamond dust by moving the hardened steel pressure plate 4 to and fro on the base plate 1. The diamond dust is pressed into the wire under the pressure exerted by the pressure plate 4 under a pressing force of, for example, about 20 kg or about 20 to 300N. However, during this pressing step, the wire must be rolled, by the reciprocating motion of the steel pressure plate 4, along the steel plate 1 about the positions 8, 9, and 10. During this rolling process, the diamond dust is pressed into place at the same time.

The wire 5 is coated along a breadth of about 15 mm by the reciprocating motion of the steel pressure plate 4. Once this is accomplished by rolling to and fro, the pressure is lifted and the wire pushed further by this dimension. The coating step is continued in cycles in this way.

It is thus possible to roll into the wire material any type of particles harder than this wire material. In this connection, care must be taken that the rolling pressure does not become a roll-shaping process for the wire. In other words, the wire must essentially retain its original cross section.

The wire to be coated is generally circular wire, although it would basically also be possible to use other round forms, for example, oval wires, for performing this coating process.

The aforedescribed rudimentary device according to FIG. 1 and FIG. 2 does make it possible to manufacture a wire saw by hand with cyclic coating operations, wherein the diamond dust is applied to the plate 1 either directly as powder or as a suspension. This type of coating process is basically very expedient, because it can be readily performed and is inexpensive. Furthermore, this process is practical, which is of primary importance, in that diamond saws coated in this way exhibit substantially better operating lifetimes, with otherwise identical properties regarding quality, than the saws known heretofore. Additionally, these saws are inexpensive in their manufacture due to the simple process.

Of course, it would basically be possible to guide the wire between several, for example three, notched rolls distributed uniformly along the periphery, practically as in a three-jaw chuck, to provide the wire circumference with diamond dust in this way. However, such a device, is complicated in structure and operation. Wires manufactured thereby had an inferior quality as compared in quality with the aforedescribed wires.

Care must be taken, when performing the rolling step to press the diamond dust or other hard material dusts into place, that the pressure placed on the wire is uniformly exerted. Otherwise wire deformations are produced which later on become apparent as breaks in the wire saw.

Figure 3:
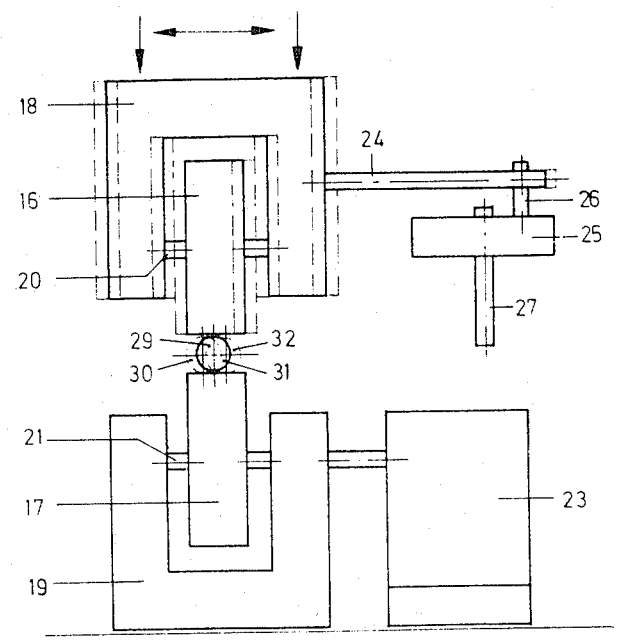
FIG. 3 shows a coating machine from the front.

FIG. 3 and FIG. 4 show a device, again in a completely schematic illustration, used for coating a substrate wire with relatively hard particles by a mechanical process.

Figure 4:
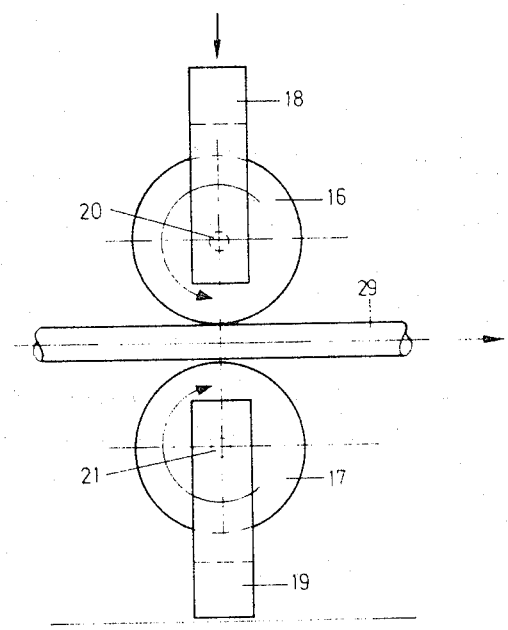
FIG. 4 shows the coating machine of FIG. 3 in a lateral view.
Figure 5:
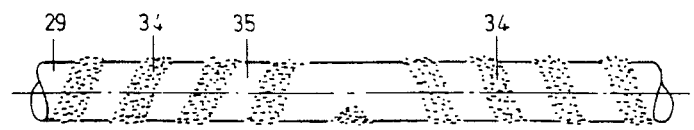
FIG. 5 shows a portion of coated wire.

This wire coating apparatus 15 shown in FIG. 3 and FIG. 4 comprises a top roll 16 and a bottom roll 17, replacing the steel plates 1 and 4 with respect to their function. The bottom roll 17 is mounted in a lower yoke 19. The top roll 16 is mounted in an upper yoke 18. The two rolls 16 and 17 are joined to their yokes 18 and 19 by way of respectively one shaft 20 and 21. A drive motor 23 serves for driving the roll 17. The top roll 16 can be connected with this roll 17 in a driving fashion, for example by way of gear wheels, or it can run practically freely while being driven by way of the wire. The upper yoke 18 is joined via an arm 24 to a rotating disk 25 carryig an eccentric pin 26. The rotating disk 25 has a drive shaft 27 coupled preferably to the drive motor 23. The wire 29 will assume, during the coating step on the surface of the bottom roll 17, the wire cross section positions 30, 31, and 32 by the to and fro movement of the top roll 16. The diamond dust, applied to the outer surfaces of the rolls 16 and 17, is applied to or rolled into the wire 29—with alternating right-hand and left-hand threads—in a spiral shape. Such a diamond dust coating 34 extending helically about the base wire 29 and leaving vacant spaces 35 is shown in FIG. 5. This form of coating has the great advantage that the vacant spaces 35 serve for accommodating the cuttings whereby the friction during the sawing step remains uninfluenced by sawdust. This has a positive effect on the lifetime of the saws. The two rolls 16 and 17 are hardened and ground. It is not only possible to drive both rolls in synchronism, but also to move both yokes to and fro. Here again, just as in the manual device according to FIG. 1 and FIG. 2, cyclic coating can be performed.

The feeding of the wire 29 takes place by the action of adhesive friction between the driven roll and the wire. Also, damage to the wire 29 is avoided by the soft entrance of the wire between the rolls 16 and 17. However, care must be taken during stressing of the rolls 16 and 17 that the wire 29 is not rolled out to a smaller cross section or some other cross-sectional shape between the rolls. In other words, no constriction must be produced in the wire.

Of course, it is possible to provide two separate motors instead of one drive motor for the rolls 16 and 17 and the rotating disk 25 so that the pitch of the diamond dust coating 34 can be changed as desired, in particular so that the coating can also be applied as a coherent ribbon. The breadth of the coating is about 10 to about 25 mm, preferably about 15 to about 20 mm.

Figure 6:
FIG. 6 shows a view analogous to FIG. 5 with a different form of coating.

It is furthermore also possible basically to synchronize the apparatus so that the coating is executed in one direction during the transverse movement of the top roll 16. The feed and therefore also the coating operation are discontinued in the other direction. In this way, a helical band is obtained with a direction rotation as shown in FIG. 6.

If the coating process, in contrast thereto, is executed continuously, then, during one movement, a helical band section with a right-hand pitch is produced. In the opposite sense, a subsequent band with a left-hand pitch is produced as shown in FIG. 5 wherein the region of changing from right-hand to left-hand thread is illustrated.

Another possibility resides in subjecting a wire 29 to two wire coating devices 15 in series, wherein the two devices can operate in synchronism or in opposing cycles. It is thus possible to produce practically any desired helical patterns which supplement each other or overlap each other, which are in the form of a right-hand thread or a left-hand thread, or the like. These patterns are affected by the pass-through speed and the mutual spacing of the two coating units.

It is possible to resiliently support, along the lines of FIG. 3, the top roll 16 with the yoke 18 with respect to the bottom roll 17 and the lower yoke 19 so that, by applying a corresponding weight to the upper yoke 18, the pressure on the wire 29 can be rendered adjustable. However, it is also possible to provide the spacing between the two rolls 16 and 17 so that it is adjustable, but firm. In this case, though, a take-off means for the wire 29 must be provided in some cases, with the aid of a driven take-off device. This makes it possible to vary the rolling-in pressure for the diamond particles independently of the safe feeding operation.

It would also be basically possible to produce between wire and apparatus a rotational movement about the longitudinal axis of the wire and thereby to couple the axial movement with a rotary movement in order to attain the desired, helically shaped coating.

It is furthermore possible with such a device to coat a wire with a cheaper abrasive, such as $Al_2O_3$, $SiO_2$, or the like, or with a thinner layer of diamond dust. In this connection, such a wire saw could be provided for one-time usage. With an appropriate width of the rolls 16 and 17, that is, by fashioning them as milling rolls, several parallel wires 29 can be simultaneously provided with particles.

With respect to the basic material of a wire shape, steel wires with a copper coating have heretofore been used, in particular. Such wires are utilized for high amperages and are known under the names "Copperweld", "Staku", "Custa", etc. However, tests have also been carried out with nickel-plated steel wire. More detailed tests, though, showed that practically any steel wire can be coated readily in this way, inter alia also piano wire. However, the possibility must not be excluded that also other wires would be suitable, for example wires of a synthetic resin, especially polyamide, polyester, and the like.

Additional tests have demonstrated that, after coating the wire with diamond dust or some other dust, additional embedding by chemical methods with the use of nickel will give firmer hold to the rolled-in diamond particles. Consequently, this results in a substantial prolongation of the operating life of the saw.

Figure 7:
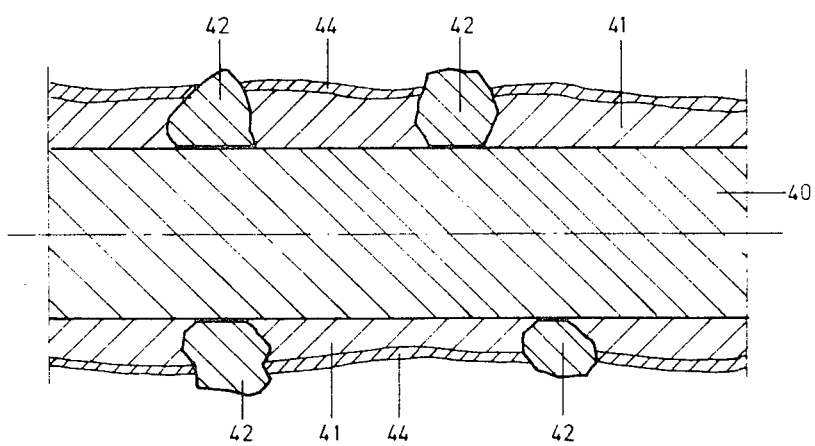
FIG. 7 shows a longitudinal section through a wire with embedded hard particles.

FIG. 7 shows, on a substantially enlarged scale, a wire coated with diamond dust to which such an embedding layer has been applied.

The figure shows a section of saw wire having a steel wire core 40, a cooper cladding 41, and diamond particles 42 rolled into the wire. A chemically applied nickel layer 44 embeds the diamond particles 42 and thus lessens the danger of spalling during the sawing step.

In such a wire saw, the diameter of the steel wire core 40 can be, for example, about 200 μm.

The thickness of the copper layer can be about 25 μm and the thickness of the superimposed nickel layer can be about 5 μm. In this case, the diamond particles, which are of equal size if at all possible, normally project by about 10 μm from the nickel layer 44.

Usually, monocrystalline diamonds—natual or artificial ones—are utilized having dimensions on the order of about 20–40 or about 60 μm. The diamond powder is applied to the rolls by means of brushes after having been mixed with cutting fluid in concentrated form.

A good saw wire has the following properties:
1. high tensils strength;
2. low elongation;
3. great long-term stability against bending stress; and
4. sufficient ductility so that the diamond grains can be expediently rolled in.

Heretofore, wires have been produced with diameters of about 70 μm to about 0.5 mm, with grains from about 1 to about 60 μm. However, coarser grains can also be used. The aforementioned, chemically applied nickel layer can also be thicker. If such nickel layers are applied, the grain size should not fall below about 12 μm.

While I have shown and described several embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An apparatus for producing wire-like saw comprising:
    at least two hardened and ground metal parts means movable relative to each other;
    said parts means disposed to move a wire-like form therebetween and to press particles on a surface of said wire-like form;
    means for feeding an elongated wire-like form;
    means for dispensing particles on said parts means to be pressed on the surface of said wire-like form;
    whereby said wire-like form is rolled about its longitudinal axis between two surfaces of said parts means to form a wire-like saw.

2. The apparatus according to claim 1, wherein said parts means being plates.

3. The apparatus according to claim 1, wherein said parts means being rollers.

4. The apparatus according to claim 1, wherein one parts means being stationary.

5. The apparatus according to claim 1, wherein at least one of said parts means being connected to a mechanical drive means.

6. The apparatus according to claim 5, wherein said at least one parts means being fixedly mounted and said drive means being a motor whereas said other parts means being reciprocated in an axial direction.

7. The apparatus according to claim 6, wherein said reciprocation of said other parts means being made by an eccentric means.

8. The apparatus according to claim 7, wherein the eccentric means being driven by said motor.

9. The apparatus according to claim 6, wherein said other parts means includes pressing force means.

10. The apparatus according to claim 1, further comprising driven take-off means for said wire-like form.

11. The apparatus according to claim 1, wherein the wire-like form being circular.

12. The apparatus according to claim 1, wherein the wire-like form being oval.

13. The apparatus according to claim 1, wherein material of said particles being diamond and $Al_2O_3$, $SiO_2$.

14. The apparatus according to claim 1, wherein said particles being a powder.

15. The apparatus according to claim 1, wherein said particles being a suspension.

16. The apparatus according to claim 1, wherein said dispensing means includes brush means.

17. The apparatus according to claim 1, wherein said wire-like form being coated or plated.

18. The apparatus according to claim 1, wherein material of said wire-like form includes steel and synthetic resins.

* * * * *